United States Patent
Gates et al.

(10) Patent No.: US 9,266,513 B2
(45) Date of Patent: Feb. 23, 2016

(54) FRONT PARK BRAKE PROTECTION CONTROLS

(71) Applicant: Caterpillar Inc., Peoria, IL (US)

(72) Inventors: John Gates, Oswego, IL (US); Biagio Ciarla, Appleton, WI (US); Josh Nolke, Franklin, WI (US); Nasim Suterwala, Naperville, IL (US); Andrew Ellis, Tyne & Wear (GB); Neil Taylor, Northumberland (GB); Ian R A Hawkes, West Mindlands (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/222,329

(22) Filed: Mar. 21, 2014

(65) Prior Publication Data

US 2015/0266459 A1 Sep. 24, 2015

(51) Int. Cl.
| | | |
|---|---|---|
| *G06F 7/70* | (2006.01) | |
| *B60T 8/32* | (2006.01) | |
| *G05G 5/06* | (2006.01) | |
| *B60T 13/66* | (2006.01) | |
| *F16D 55/22* | (2006.01) | |
| *B60T 1/06* | (2006.01) | |

(52) U.S. Cl.
CPC .............. *B60T 13/662* (2013.01); *B60T 1/062* (2013.01); *F16D 55/22* (2013.01)

(58) Field of Classification Search
USPC ................................ 701/70; 303/192; 74/534
See application file for complete search history.

(56) References Cited

U.S. PATENT DOCUMENTS

| | | | |
|---|---|---|---|
| 6,260,934 B1 * | 7/2001 | Lee | 303/192 |
| 6,619,460 B1 | 9/2003 | Carlsson et al. | |
| 8,540,067 B2 | 9/2013 | Kingston et al. | |
| 2003/0217899 A1 * | 11/2003 | Tanaka | 188/151 A |
| 2005/0235820 A1 * | 10/2005 | Fujiwara et al. | 91/369.2 |
| 2006/0001316 A1 * | 1/2006 | Tachiiri et al. | 303/191 |
| 2006/0186638 A1 * | 8/2006 | Varner | 280/506 |
| 2007/0151401 A1 * | 7/2007 | Murase | 74/538 |
| 2007/0210643 A1 * | 9/2007 | Perkins | 303/89 |
| 2008/0035444 A1 * | 2/2008 | Schiele et al. | 192/219.5 |
| 2009/0050435 A1 | 2/2009 | Yamada et al. | |
| 2010/0181823 A1 * | 7/2010 | Eberling | 303/9.76 |
| 2010/0204872 A1 * | 8/2010 | Ishikawa et al. | 701/29 |

FOREIGN PATENT DOCUMENTS

| | | |
|---|---|---|
| GB | 1575176 | 9/1980 |
| WO | 2006090943 A1 | 8/2006 |
| WO | 2013034559 A1 | 3/2013 |

* cited by examiner

*Primary Examiner* — Thomas G Black
*Assistant Examiner* — Tyler Paige
(74) *Attorney, Agent, or Firm* — Miller, Matthias & Hull LLP

(57) ABSTRACT

A system and method are provided for enhancing the slope-holding capability of an earth-moving machine. The machine includes a plurality of ground-engaging elements and a first parking brake configured to brake a first subset of the plurality of ground-engaging elements. A second parking brake is mounted and is configured to brake a second subset of the plurality of ground-engaging elements. A brake controller is configured to sense engagement of the first parking brake and to engage the second parking brake when the first parking brake is engaged only if one or more machine state criteria are also met. In an embodiment, the one or more machine state criteria include zero machine speed, neutral transmission state, and a machine slope that exceeds a predetermined threshold slope.

20 Claims, 6 Drawing Sheets

FRONT PARK BRAKE PROTECTION CONTROLS

TECHNICAL FIELD OF THE DISCLOSURE

The present disclosure relates to large machine operation and, more particularly, relates to providing a parking brake control mechanism for use of an auxiliary parking brake.

BACKGROUND OF THE DISCLOSURE

Large industrial machines such as those used in material transportation can be very heavy, especially when fully loaded. For this reason, a parking brake or emergency brake (both referred to interchangeably herein as a "parking brake") is often needed to ensure that the machine comes to a complete stop when commanded, and to ensure that once stopped, the machine does not undergo unwanted movement, such as by rolling down a grade under the influence of gravity. The latter is referred to as the machine's "slope-holding" capability.

One such heavy industrial machine that requires enhanced slope-holding capabilities is the articulated truck. This type of truck is often used for heavy material hauling and is typically employed in treacherous off-road conditions. The weight of the machine when loaded may be twice that of the empty machine. As such, the required slope-holding capability of the machine when fully loaded may be substantial.

Additional brakes may be used. For example, a parking lock device for a machine is shown in U.S. Pat. Pub. US2009/0050435. The parking lock device is mounted on a transmission of the machine. However, it will be appreciated from the following description that enhanced control measures are needed if an extra brake is to provide enhanced slope-holding capability while also providing long component life and high spatial efficiency.

The present disclosure is directed to a system and method to improve machine emergency braking in order to address one or more of the problems or shortcomings set forth above. However, it should be appreciated that the solution of any particular problem is not a limitation on the scope of this disclosure or of the attached claims except to the extent expressly noted. Additionally, this background section discusses problems and solutions noted by the inventors; the inclusion of any problem or solution in this section is not an indication that the problem or solution represents known prior art except as otherwise expressly noted.

SUMMARY OF THE DISCLOSURE

In accordance with one aspect of the present disclosure, an earth-moving machine is provided having enhanced slope-holding capability. The machine includes a plurality of ground-engaging elements and a first parking brake configured to brake a first subset of the plurality of ground-engaging elements. A second parking brake is mounted and is configured to brake a second subset of the plurality of ground-engaging elements. A brake controller is configured to sense engagement of the first parking brake and to engage the second parking brake when the first parking brake is engaged only if one or more machine state criteria are also met. In an embodiment, the one or more machine state criteria include zero machine speed, neutral transmission state, and a machine slope that exceeds a predetermined threshold slope.

In a further embodiment, a method is provided for immobilizing a machine on a slope. The machine includes a transmission for powering ground-engaging elements, a first park brake for braking some of the ground-engaging elements and a second park brake for braking others of the ground-engaging elements. The method includes detecting that the first park brake has been engaged, determining whether the machine speed is zero, and engaging the second park brake only when the speed of the machine is zero.

In yet a further embodiment, a machine brake system is provided. The system includes a first park brake having an engaged state and a disengaged state, a second park brake having an engaged state and a disengaged state, a plurality of sensor inputs including a machine speed sensor input, a transmission gear selector input, a first brake state input and an incline sensor input, and a controller configured to receive the sensor inputs and to command engagement of the second park brake when the first park brake is engaged, the transmission is in neutral, the machine speed is zero, and the incline sensor input indicates an incline exceeding a predetermined incline threshold value.

Additional and alternative features and aspects of the disclosed methods and systems will become apparent from reading the detailed specification in conjunction with the included drawing figures.

DETAILED DESCRIPTION OF THE DISCLOSURE

As noted above, a park brake on the trailer of an articulated truck may serve to provide a parking brake function. Typically such a brake serves as the park brake and as a tertiary brake to meet ISO regulations. In an embodiment of the disclosure, a second (e.g., front) park brake is fit to the machine transmission output to increase slope-holding capability. Other mounting locations, e.g., the transfer case, the front axle, the rear axle, and so on, may be used without departing from the scope of the disclosed principles. In theory, any size or strength of parking brake could be provided; indeed, one could theoretically install a parking brake whose slope-holding capability approached the limits of the machine's traction.

However, the inventors have found that in order to minimize the cost and packaging impact of the second park brake, a very small low capacity second parking brake system is advisable. However, using a small low capacity brake as the second park brake leads to short brake life due to tertiary brake loads when the second park brake is controlled in the same manner as the first park brake. That is, if the second park brake was also required to serve as a tertiary brake, it would need to be a brake with a high dynamic braking capacity and would be cost prohibitive. In addition, candidate brakes that are cost effective and small enough to avoid machine reconfiguration tend to have lower life components such as springs, friction linings, etc. relative to the rear park brake.

In short, traditional parking brake requirements would tend to mandate a costly and large second brake with high dynamic braking capacity. Conversely, the factors of cost and space would tend to mandate a small and inexpensive second brake of much more limited dynamic braking capacity.

In an embodiment, a small second brake of limited dynamic braking capacity is used. In conjunction with this small second brake, a control system is constructed and configured so as to utilize the second brake's holding capacity while at the same time not exceeding the brake's limited dynamic braking capacity at any time, nor imposing undue wear and tear on the brake.

Figure 1:
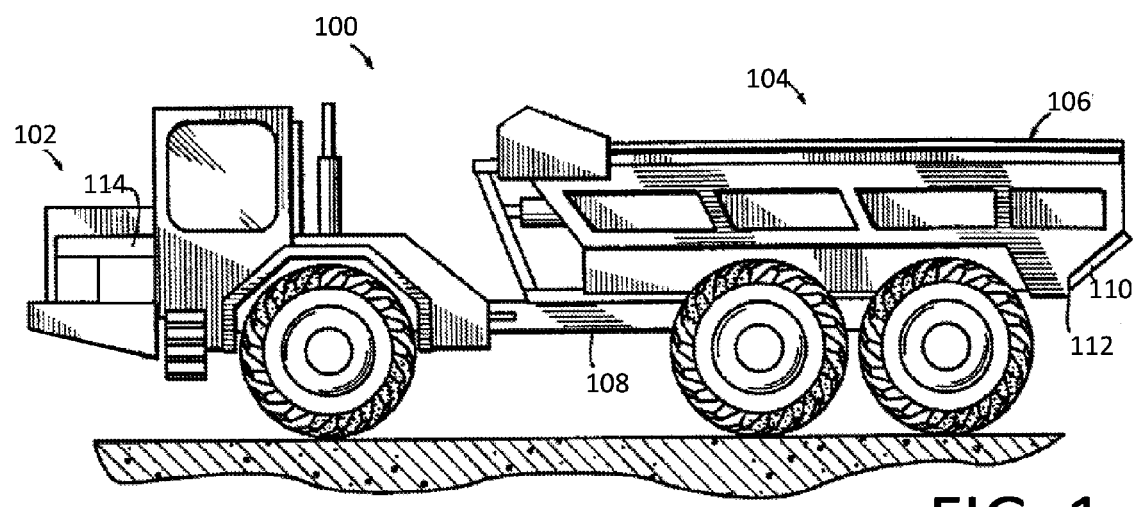
FIG. 1 is a pictorial representation of a side view of an exemplary machine within which embodiments of the disclosed principles may be implemented.

Before discussing specific details and features of the disclosed embodiments, an example environment will be discussed. In this regard, FIG. 1 shows a simplified side view of an articulated truck 100. The articulated truck 100 as illustrated includes a tractor 102 and a trailer 104 having a material carrying bed or receptacle 106 mounted on a frame 108. The bed 106 is enclosed by a pair of generally upright, spaced apart, parallel side walls. The bed 106 may further include a tailgate 110 pivotable at its bottom edge with respect to a rear edge 112 of the bed 106. As such, the machine 100 is configured to load, carry and unload dirt, rock, ore, gravel and other materials. Movement of the machine 100 over the underlying surface, e.g., while carrying a load or returning to the loading point, is powered by an engine 114 whose output is harnessed and distributed via a transmission (not shown in FIG. 1) to ground engaging elements such as wheels in the illustrated embodiment.

Figure 2:
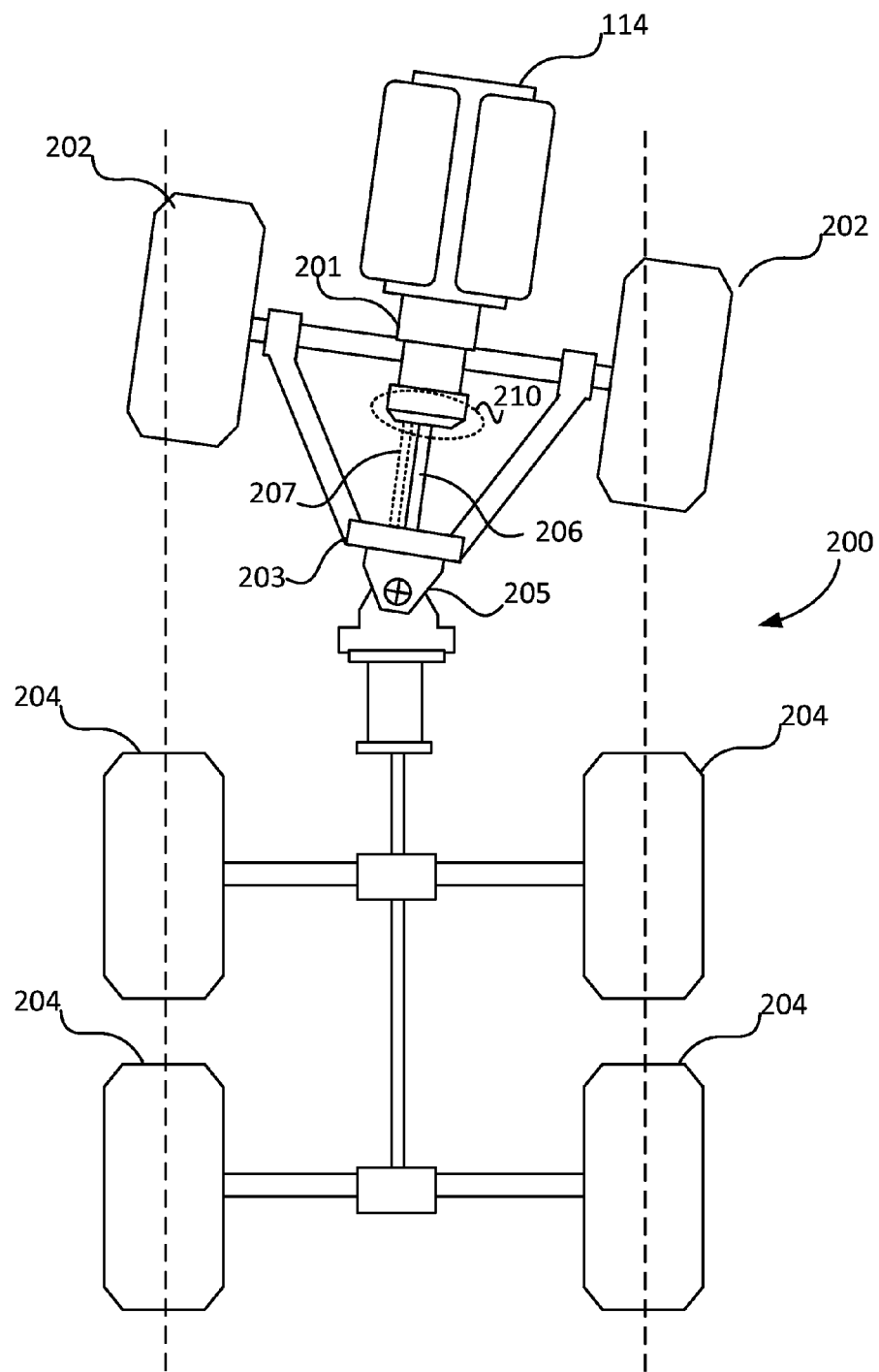
FIG. 2 is a schematic plan view drawing of an articulated truck with respect to which the disclosed principles may be used.

A simplified plan view of the drive system 200 of the articulated truck 100 is shown in FIG. 2. In particular, the machine engine 114 is connected to and drives the machine transmission 201. In turn, the machine transmission 201 drives the machine front wheels 202 via a transfer box 203. A first shaft 206 from the machine transmission 201 drives the transfer box. In turn, a second shaft 207 from the transfer box drives the machine front wheels 202 (the second shaft 207 is displaced slightly in the figure for visibility). The transfer box 203 also provides power to the rear wheels 204 via a short drive shaft between the transfer box and the hitch 205 (the articulation joint between the tractor and the trailer). Although the ground-engaging elements of the articulated truck 100 are illustrated as wheels, it will be appreciated that the disclosed principles apply equally to tracked or partially-tracked machines.

As noted above, there may be a need to park a machine such as machine 100 in a location, and to have the machine remain immobile despite a slope of the ground surface underlying the machine in that location. Typically, a parking brake is used for this purpose. The parking brake may be in any effective location such as the hitch or the center axle. Generally, the parking brake provides sufficient slope-holding ability for most slopes, but do not necessarily provide slope-holding ability beyond specific combinations of slope, load, and ground conditions. To that end, in an embodiment, a small second brake is employed as illustrated in the simplified drawing of FIG. 3. In particular, in the illustrated embodiment, the second brake 301 is mounted at the output area 210 of the machine transmission 201. It will be appreciated that the second brake 301 may alternatively be mounted elsewhere, e.g., on the transfer box or front axle. The second brake 301 may be of any suitable brake type, such as a disc brake, drum brake, band brake, and so on.

Figure 3:
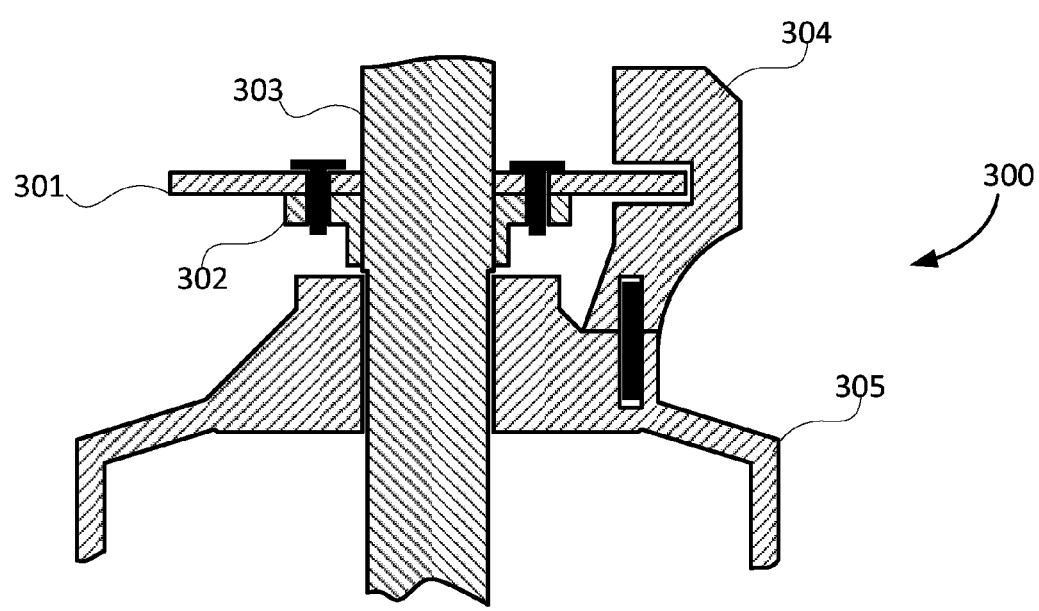
FIG. 3 is a simplified cross-sectional view of a disc brake attachment at a transmission output.

An exemplary brake arrangement for the second brake system is shown in FIG. 3. The illustrated second brake system 300 includes a braking disc 301 mounted to a drive plate or yoke 302. In an embodiment, the braking disc 301 is 420 mm diameter steel disc of about 0.5" thickness. The yoke 302 is splined to the transmission output shaft 303, and thus the braking disc 301 is rotationally fixed to the transmission output shaft 303.

A caliper 304 is affixed to the transmission housing 305, e.g., via one or more bolts, rivets or other suitable fasteners. Though not shown, a mounting bracket of a suitable material such as ductile iron may be used to attach the caliper 304 to the transmission housing 305. The caliper 304 is mounted so as to surround an edge of the braking disc 301. In order to fix the braking disc 301 in place, the caliper 304 is closed, trapping the braking disc 301 and thus fixing the braking disc 301 and the associated transmission output shaft 303 in a stationary state.

In an embodiment, the caliper device 304 is a normally closed spring biased caliper that is pressurized by hydraulic fluid to remain open. Alternatively, the caliper device 304 is a normally open spring biased caliper that is pressurized by hydraulic fluid to close. The former is useful in ensuring that the machine is immobilized when machine power is off.

As was noted above, the second brake system 300 may have limited dynamic braking capacity to accommodate cost and space constraints. However, the use of a lower capacity system requires careful management to avoid actually increasing operating costs through frequent forced replacement of, or service to, the components of the second brake system 300. As such, a brake control system in an embodiment is configured to effectively utilize the second brake's holding capacity while not exceeding the brake's limited dynamic braking capacity and thus not exposing the second brake to undue wear and tear.

Figure 4:
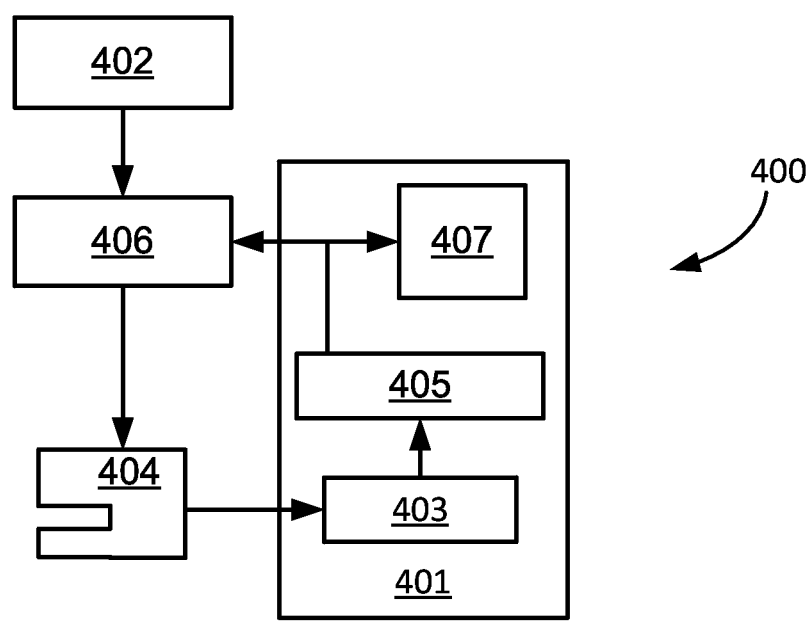
FIG. 4 is a hydraulic circuit diagram of a hydraulic circuit associated with a second parking brake in accordance with the disclosed principles.

An exemplary control and actuation system 400 is shown in the simplified schematic of FIG. 4. In the illustrated example, the hydraulic caliper 404 (304) is powered by a hydraulic circuit 401 and controlled by a controller 402. The hydraulic circuit 401 includes a hydraulic reservoir 403 that provides fluid, via a hydraulic pump to the circuit 401. A primary control valve 405 controls the flow of pressurized fluid to a brake control valve 406. In an embodiment, the brake control valve 406 is an electrically actuated or electronic solenoid valve. An accumulator 407 is connected in parallel to the brake control valve 406 to increase instantaneously available flow and to buffer any shocks in the system.

The state of the brake control valve 406 is managed during operation of the machine by the controller 402. In particular, as will be described in greater detail below, the a controller 402 manages the brake state based on the current underlying slope, machine transmission state, machine rear park brake state and machine speed in order to minimize second brake wear while taking advantage of the second brake's slope-holding capabilities.

INDUSTRIAL APPLICABILITY

In general terms, the present disclosure sets forth a system and method for providing a small auxiliary brake for additional slope holding power for a machine such as an articulated truck. It will be appreciated that the described principles and techniques apply equally to other industrial, manufacturing, farming, mining or earth moving machines wherein additional slope holding ability is required within certain space and/or budget constraints.

Figure 5:
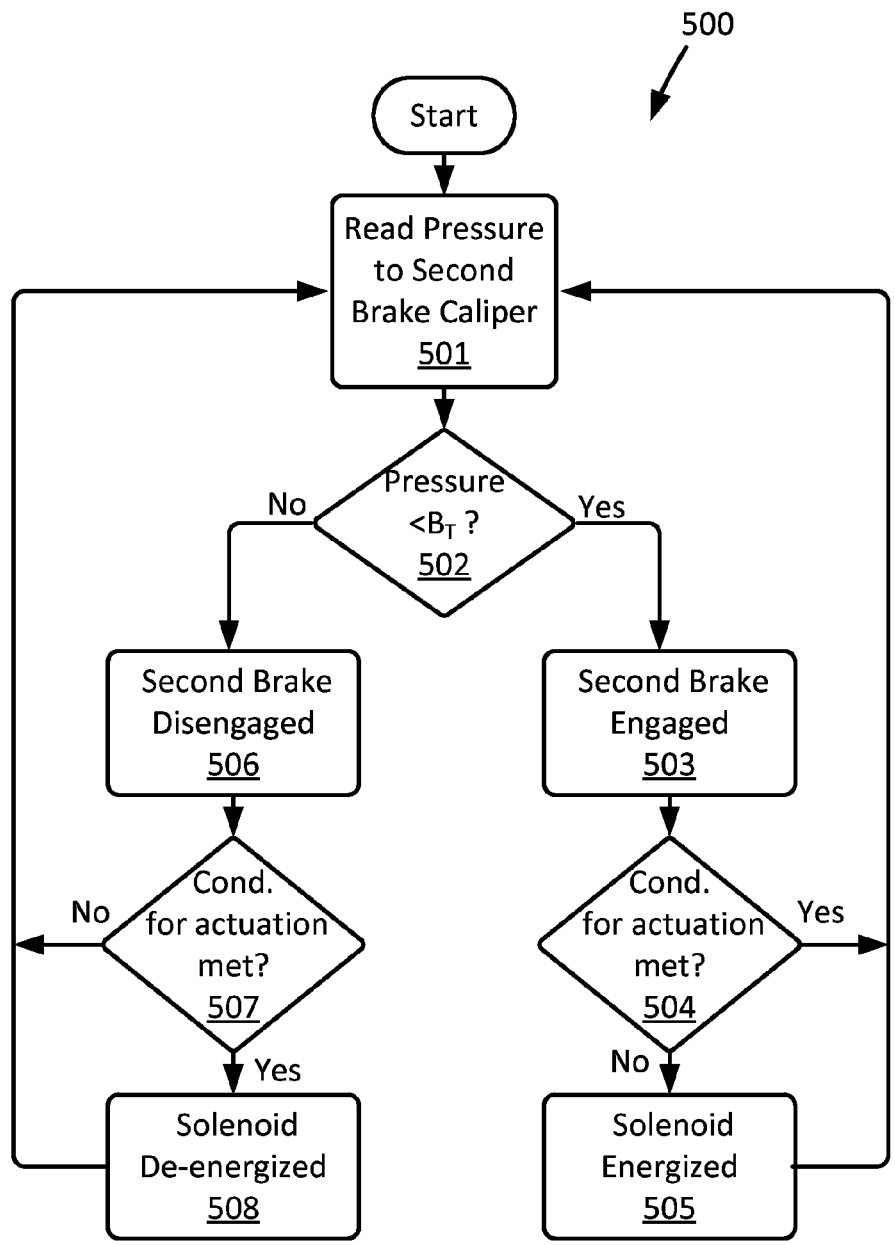
FIG. 5 is a flow chart of a process for controlling a second brake based on machine environment and status in accordance with an embodiment of the disclosed principles.

An exemplary brake management process 500 is shown in FIG. 5. The illustrated process 500 assumes that the brake control valve 406 is an electrically actuated solenoid valve and that the caliper 404 is spring biased closed except when pressurized by actuation of the brake control valve 406. It will be appreciated that other valve and caliper configurations may be used with simple alterations of the open/closed state of the control valve.

At stage 501 of the process 500, the controller 402 checks the hydraulic pressure in the circuit between the brake control valve 406 and the caliper 404. At stage 502, the controller 402 determines whether the observed pressure is less than a threshold value $B_T$ reflecting a threshold pressure needed to open the caliper 404. If the observed pressure is less than the threshold value $B_T$, then the second brake status is set as Engaged at stage 503 and the process 500 continues to stage 504. At stage 504, the controller 402 determines whether all conditions for second parking brake engagement are met. In an embodiment these conditions include requirements that (1) the main parking brake be engaged, (2) the transmission is in neutral, (3) the cab inclinometer or other slope sensing device senses a slope greater than or equal to a slope or incline threshold value such as 5%, and (4) either the transmission output speed (TOS) or the front wheel speed equals zero.

If at stage 504 the controller 402 determines that these conditions are all met, then the process 500 returns to stage 501 and continues from there. Otherwise, the process 500 flows to stage 505 wherein the controller 402 commands the brake control valve 406 to be energized, thus opening the caliper 404.

If at stage 501, it is instead determined that the hydraulic pressure in the circuit between the brake control valve 406 and the caliper 404 is greater than the threshold value $B_T$, then the second brake status is set as Disengaged at stage 506 and the process 500 continues to stage 507. At stage 507, the controller 402 determines whether all conditions for second parking brake engagement are met. As noted above, in an embodiment these conditions include requirements that (1) the main parking brake be engaged, (2) the transmission is in neutral, (3) the cab inclinometer or other slope sensing device senses a slope greater than or equal to a slope threshold such as 5% or other value, and (4) either the transmission output speed (TOS) or the front wheel speed equals zero.

If at stage 507 the controller 402 determines that these conditions are not all met, then the process 500 returns to stage 501 and continues from there. Otherwise, i.e., if the controller 402 determines that these conditions are all met, the process 500 flows to stage 508 wherein the controller 402 commands the brake control valve 406 to be de-energized, thus closing the caliper 404 and braking the transmission output.

Figure 6:
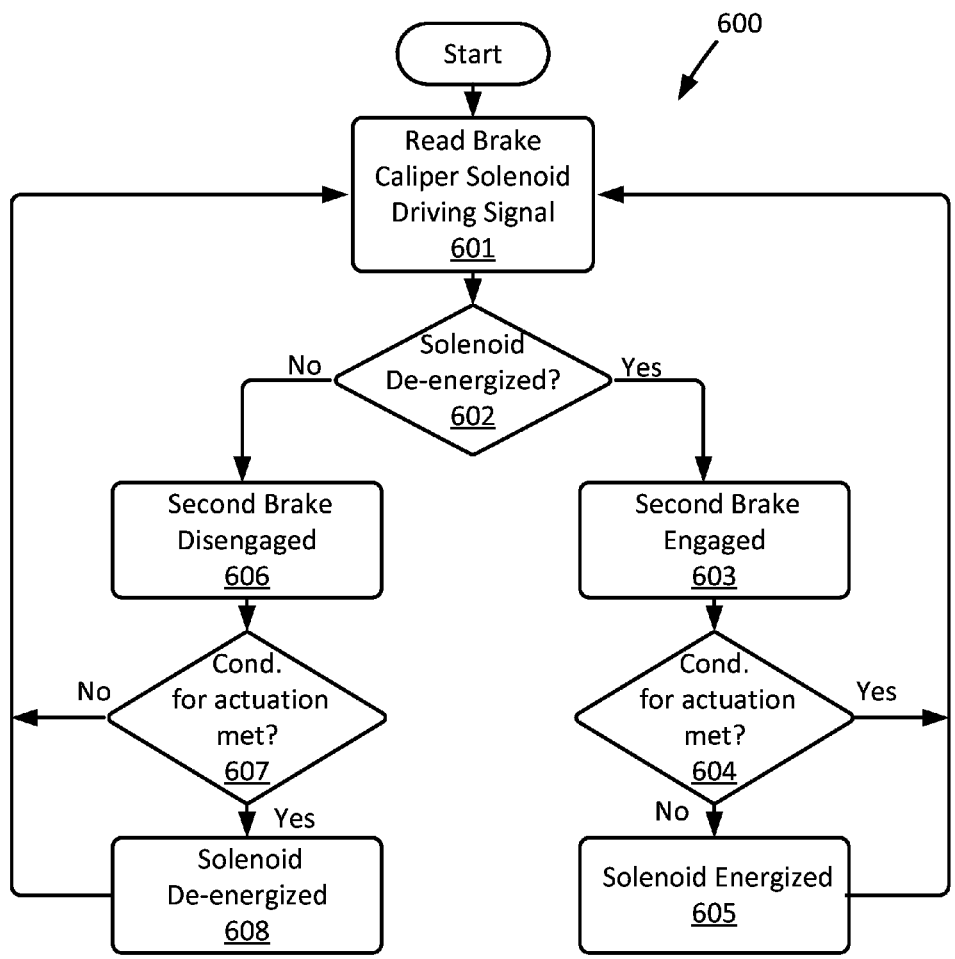
FIG. 6 is a flow chart of an alternative process for controlling a second brake based on machine environment and status in accordance with an alternative embodiment of the disclosed principles.

While the process 500 illustrated in FIG. 5 relies upon sensing the pressure of the hydraulic circuit between the brake control valve 406 and the caliper 404, an alternative process allows the second brake to be effectively managed even when such a pressure sensor is absence or malfunctioning. In particular, FIG. 6 shows a process 600 wherein the second brake is managed without knowledge of the circuit pressure between the caliper 404 and the brake control valve 406.

At stage 601 of the process 600, the controller 402 reads the driving signal of the brake control valve 406 and determines, at stage 602, whether the brake control valve 406 is de-energized. If the brake control valve 406 is de-energized, then the second brake status is set as Engaged at stage 603 and the process 600 continues to stage 604. At stage 604, the controller 402 determines whether all conditions for second parking brake engagement are met. In an embodiment these conditions include requirements that (1) the main parking brake be engaged, (2) the transmission is in neutral, (3) the cab inclinometer or other slope sensing device senses a slope greater than or equal to a slope threshold such as 5%, and (4) either the transmission output speed (TOS) or the front wheel speed equals zero.

If at stage 604 the controller 402 determines that these conditions are all met, then the process 600 returns to stage 601 and continues from there. Otherwise, the process 600 flows to stage 605 wherein the controller 402 commands the brake control valve 406 to be energized, thus opening the caliper 404.

If at stage 601, it is instead determined that the brake control valve 406 is energized, then the second brake status is set as Disengaged at stage 606 and the process 600 continues to stage 607. At stage 607, the controller 402 determines whether all conditions for second parking brake engagement are met. As noted above, in an embodiment these conditions include requirements that (1) the main parking brake be engaged, (2) the transmission is in neutral, (3) the cab inclinometer or other slope sensing device senses a slope greater than or equal to a slope threshold such as 5%, and (4) either the transmission output speed (TOS) or the front wheel speed equals zero.

If at stage 607 the controller 402 determines that these conditions are not all met, then the process 600 returns to stage 601 and continues from there. Otherwise, i.e., if the controller 402 determines that these conditions are all met, the process 600 flows to stage 608 wherein the controller 402 commands the brake control valve 406 to be de-energized, thus closing the caliper 404 and braking the transmission output.

It will be appreciated that the present disclosure provides an effective and efficient mechanism and control system for providing additional slope-holding capacity for a machine during steep conditions. Not only do the described system and method generally improve slope-holding ability, but they are capable of doing so inexpensively and without excessive additional space claims within the machine.

While only certain examples of the described system and method have been set forth, alternatives and modifications will be apparent from the above description to those skilled in the art. These and other alternatives are considered equivalents and within the spirit and scope of this disclosure and the appended claims.

What is claimed is:
1. An earth-moving machine comprising:
a plurality of ground-engaging elements;
a first parking brake configured to brake a first subset of the plurality of ground-engaging elements;
a second parking brake configured to brake a second subset of the plurality of ground-engaging elements, the second subset being distinct from the first subset; and
a controller configured to sense engagement of the first parking brake and to engage the second parking brake when the first parking brake is engaged if one or more machine state criteria are also met.
2. The earth-moving machine in accordance with claim 1, wherein the machine comprises a front axle and one or more rear axles, and wherein the first subset of the plurality of ground-engaging elements are associated with the one or more rear axles and wherein the second subset of the plurality of ground-engaging elements are associated with the front axle.

3. The earth-moving machine in accordance with claim 1, wherein the plurality of ground-engaging elements include at least one of wheels and tracks.

4. The earth-moving machine in accordance with claim 1, wherein the one or more machine state criteria include machine speed, machine transmission state, and machine slope, and wherein the controller is configured to engage the second parking brake when the first parking brake is engaged only if the machine speed is zero, the machine transmission state is neutral, and the machine slope exceeds a predetermined threshold slope.

5. The earth-moving machine in accordance with claim 1, wherein the one or more machine state criteria include transmission output speed (TOS), machine transmission state, and machine slope, and wherein the controller is configured to engage the second parking brake when the first parking brake is engaged only if the TOS is zero, the machine transmission state is neutral, and the machine slope exceeds a predetermined threshold slope.

6. The earth-moving machine in accordance with claim 1, wherein the machine is an articulated truck.

7. The earth-moving machine in accordance with claim 1, wherein the second parking brake is a disc brake.

8. The earth-moving machine in accordance with claim 7, wherein the disc brake is mounted to an output shaft of a transmission of the machine.

9. The earth-moving machine in accordance with claim 8, wherein the disc brake includes a hydraulic caliper engaged by an electronic solenoid valve, and wherein the controller is configured to engage the second parking brake by actuating the electronic solenoid valve.

10. The earth-moving machine in accordance with claim 1, wherein the second parking brake has a lower dynamic braking capability than the first parking brake.

11. A method of immobilizing a machine on a slope, wherein the machine includes a transmission for providing rotational power to a plurality of ground-engaging elements, a first parking brake for braking a first subset of the ground-engaging elements and a second parking brake for braking a second subset of the ground-engaging elements, the method comprising:
   detecting, at a controller, that the first parking brake has been engaged to brake the first subset of the ground-engaging elements;
   determining, at the controller, whether a speed of the machine is zero; and
   engaging, via the controller, the second parking brake to brake the second subset of the ground-engaging elements only when the speed of the machine is zero.

12. The method of immobilizing a machine on a slope according to claim 11, wherein the step of determining whether the speed of the machine is zero further comprises determining whether the transmission is in a neutral state, and wherein engaging the second parking brake further comprises engaging the second parking brake only when the speed of the machine is zero and the transmission is in a neutral state.

13. The method of immobilizing a machine on a slope according to claim 12, wherein the step of determining whether the speed of the machine is zero further comprises determining whether the transmission is in a neutral state and determining whether the machine is inclined to greater than a threshold incline value, and wherein engaging the second parking brake further comprises engaging the second parking brake only when the speed of the machine is zero, the transmission is in a neutral state, and the machine is inclined to greater than the threshold incline value.

14. The method of immobilizing a machine on a slope according to claim 11, wherein the second parking brake is a disc brake coupled to a caliper, and wherein engaging the second parking brake comprises actuating the caliper.

15. The method of immobilizing a machine on a slope according to claim 14, wherein the caliper is controlled via a solenoid valve and is biased open, and wherein engaging the second parking brake comprises activating the solenoid valve.

16. The method of immobilizing a machine on a slope according to claim 14, wherein the caliper is controlled via a solenoid valve and is biased closed, and wherein engaging the second parking brake comprises deactivating the solenoid valve.

17. A machine brake system comprising:
   a first park brake having an engaged state and a disengaged state;
   a second park brake having an engaged state and a disengaged state;
   a plurality of sensor inputs including a machine speed sensor input, a transmission gear selector input, a first brake state input and an incline sensor input; and
   a controller configured to receive the plurality of sensor inputs and to command engagement of the second park brake when the first park brake is engaged, the transmission gear selector input indicates neutral, the machine speed sensor input indicates zero machine speed, and the incline sensor input indicates an incline exceeding a predetermined incline threshold value.

18. The machine brake system in accordance with claim 17, wherein the second park brake includes a disc brake configured for mounting on a transmission output of a machine and a caliper configured for stationary mounting so as to surround an edge of the disc brake when mounted.

19. The machine brake system in accordance with claim 18, wherein the caliper is configured for hydraulic actuation by a solenoid valve and wherein the controller is configured to command engagement of the second park brake by energizing the solenoid valve.

20. The machine brake system in accordance with claim 18, wherein the caliper is configured for hydraulic actuation by a solenoid valve and wherein the controller is configured to command engagement of the second park brake by de-energizing the solenoid valve.

* * * * *